(12) United States Patent
Fergason

(10) Patent No.: US 6,204,900 B1
(45) Date of Patent: Mar. 20, 2001

(54) MICROENCAPSULATED LIQUID CRYSTAL AND A METHOD AND SYSTEM FOR USING SAME

(76) Inventor: James L. Fergason, 158 Almendral Ave., Atherton, CA (US) 94027-3902

( * ) Notice: Subject to any disclaimer, the term of this patent is extended or adjusted under 35 U.S.C. 154(b) by 0 days.

(21) Appl. No.: 09/407,523

(22) Filed: Sep. 28, 1999

Related U.S. Application Data

(63) Continuation of application No. PCT/US98/06181, filed on Mar. 27, 1998.
(60) Provisional application No. 60/042,194, filed on Mar. 31, 1997, and provisional application No. 60/042,444, filed on Mar. 28, 1997.

(51) Int. Cl.[7] ................................................ G02F 1/1333
(52) U.S. Cl. ................................. 349/86; 349/89; 349/92
(58) Field of Search .................................. 349/86, 89, 92

(56) References Cited

U.S. PATENT DOCUMENTS

| | | | |
|---|---|---|---|
| 3,499,702 | 3/1970 | Goldmacher et al. | 350/150 |
| 3,551,026 | 12/1970 | Heilmeier | 350/150 |
| 3,578,844 | 5/1971 | Churchill et al. | 350/160 |
| 3,600,060 | 8/1971 | Churchill et al. | 350/160 |
| 3,674,338 | 7/1972 | Cartmell et al. | 350/117 |
| 3,697,297 | 10/1972 | Churchill et al. | 106/131 |
| 3,720,623 | 3/1973 | Cartmell et al. | 252/316 |
| 3,732,119 | 5/1973 | Churchill et al. | 117/1.7 |
| 3,734,597 | 5/1973 | Churchill et al. | 350/160 LC |
| 3,816,786 | 6/1974 | Churchill et al. | 313/91 |
| 3,872,050 | 3/1975 | Benton et al. | 260/37 N |
| 4,046,741 | 9/1977 | Scher | 260/77.5 |
| 4,101,207 | 7/1978 | Taylor | 350/344 |
| 4,138,362 | 2/1979 | Vassiliades et al. | 252/316 |
| 4,155,741 | 5/1979 | Scher et al. | 71/65 |
| 4,193,889 | 3/1980 | Baatz et al. | 252/316 |
| 4,285,720 | 8/1981 | Scher | 71/88 |
| 4,435,047 | 3/1984 | Fergason | 350/334 |
| 4,556,289 | 12/1985 | Fergason | 350/350 R |

(List continued on next page.)

FOREIGN PATENT DOCUMENTS

| | | |
|---|---|---|
| 0238626 | 5/1995 | (EP) . |
| WO8504262 | 8/1985 | (WO) . |

OTHER PUBLICATIONS

Drzaic, Paul et al., "High–Brightness Refective Displays . . . ", 1990, SID 90 Digest, pp. 210–213.
Crooker and Yang, "A Color Display Using Polymer–Dispersed . . . " 1990, SID 90 Digest, pp. 214–216.
Drzaic et al, "Invited Address–Dichroic–Based Displays . . . ", 1992, SID 92 Digest pp. 571–574.
Molsen et al, "Deformed–Helix Ferroelectric Effect in Polymer Dispersed . . . ", 1992, SID 92 Digest, pp. 773–775.
Zyryanov et al, "Polymer–Dispersed Ferroelectric Liquid Crystals as Display . . . ", 1992, SID 92 Digest, pp. 776–777.
Yang and Crooker, "Textures of polymer–dispersed chiral liquid . . . ", 1990, SPIE vol. 1257, pp. 60–67.
Drzaic, "Polymer dispersed nematic liquid crystal . . . ", 1986, J. Appl. Phys. 60, pp. 2142–2148.

Primary Examiner—William L. Sikes
Assistant Examiner—Tarifur R. Chowdhury
(74) Attorney, Agent, or Firm—Renner, Otto, Boisselle & Sklar, LLP

(57) ABSTRACT

A liquid crystal device, materials for making the device, and method of making and using the device, and several applications of the device, having memory is responsive to respective inputs to assume respective optical responses; the liquid crystal may be liquid crystal microencapsulated in a containment medium; the memory capability of the device allows the device to hold a prescribed optical response condition even though one of the inputs changes between respective states or values.

17 Claims, 4 Drawing Sheets

U.S. PATENT DOCUMENTS

| | | | | |
|---|---|---|---|---|
| 4,605,284 | * | 8/1986 | Fergason | 350/334 |
| 4,707,080 | | 11/1987 | Fergason | 350/334 |
| 4,878,741 | * | 11/1989 | Fergason | 350/339 F |
| 5,016,984 | * | 5/1991 | Fergason | 350/334 |
| 5,061,041 | * | 10/1991 | Fergason | 359/51 |
| 5,113,270 | * | 5/1992 | Fergason | 359/37 |
| 5,216,330 | | 6/1993 | Ahonen | 315/111.51 |
| 5,319,481 | * | 6/1994 | Fergason | 359/87 |
| 5,463,482 | * | 10/1995 | Jones | 359/51 |
| 5,479,277 | * | 12/1995 | Fergason | 359/51 |
| 5,532,854 | * | 7/1996 | Fergason | 359/93 |
| 5,717,422 | * | 2/1998 | Fergason | 345/102 |

* cited by examiner

UNPOWERED
COLORED: ABSORPTION
AND SCATTERING

POWERED
COLORLESS: TRANSPARENT

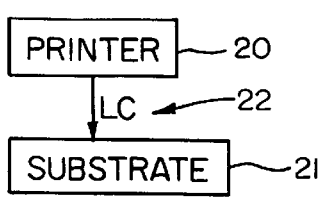
FIG. 5
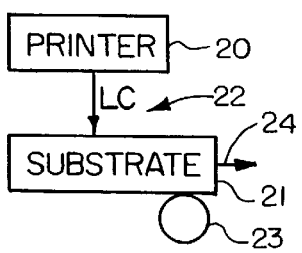
FIG. 6
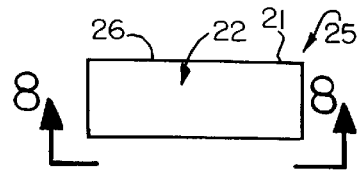
FIG. 7
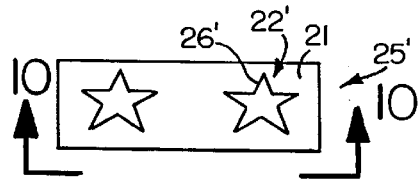
FIG. 9
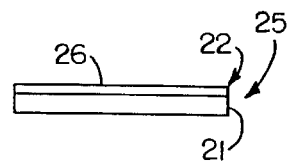
FIG. 8
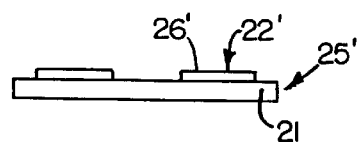
FIG. 10
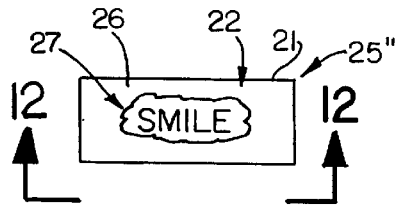
FIG. 11
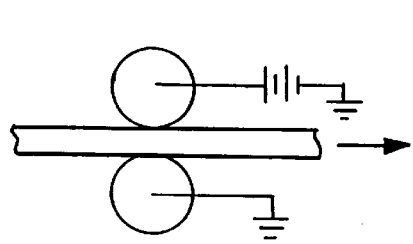
FIG. 13
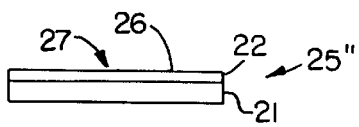
FIG. 12
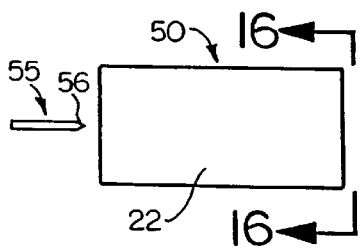
FIG. 15
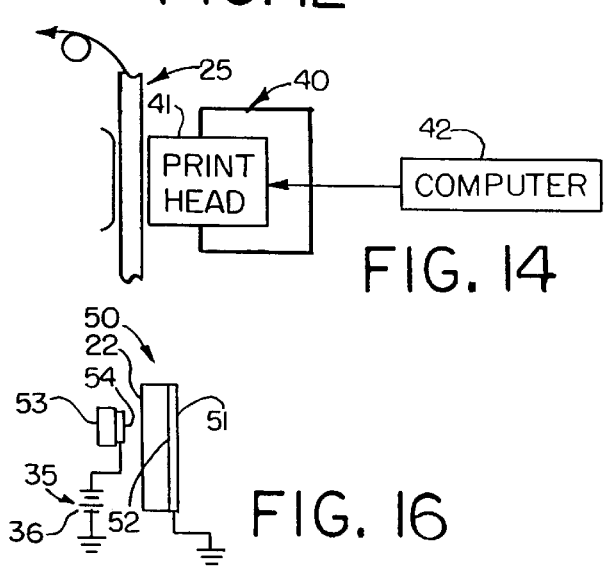
FIG. 14
FIG. 16

MICROENCAPSULATED LIQUID CRYSTAL AND A METHOD AND SYSTEM FOR USING SAME

This is a continuation of PCT/US98/06181, filed Mar. 27, 1998, claiming priority from U.S. Provisional patent applications Ser. No. 60/042,444, filed Mar. 28, 1997, and Ser. No. 60/042,194, filed Mar. 31, 1997, the entire disclosures of which are incorporated by reference.

TECHNICAL FIELD OF INVENTION

The present invention relates generally to liquid crystals and, more particularly, to microencapsulated liquid crystals and methods of making them. Additionally, the present invention relates to microencapsulated liquid crystals using dichroic, pleochroic or isotropic dyes. The invention also relates to method and apparatus for using such microencapsulated liquid crystal with or without dyes and to materials and devices which include such microencapsulated liquid crystal with and without dyes.

BACKGROUND OF INVENTION

Liquid crystal materials are widely used in making liquid crystal displays for high content information flat panel devices, specifically for personal computers, projectors and televisions. Such devices usually require relatively low power and have a satisfactory response time, and are relatively economical. The property of liquid crystals enabling use, for example, in visual displays, is the ability of liquid crystals to transmit light on one hand, and to scatter light and/or absorb light, on the other, depending upon the alignment (or lack thereof) of the liquid crystal structure (sometimes referred to as the director) with respect to a prescribed input, such as an electrical field.

The conventional liquid crystal displays including twisted nematic, supertwisted nematic, thin film transistor twisted nematic and ferroelectric liquid crystal displays are prepared by filling liquid crystal materials directly into the liquid crystal display cells. These devices operate on the principle of light polarization. Due to the method in which the devices operate they suffer from reduced optical efficiency and require backlighting in order to achieve a good brightness on the display.

Currently there are three categories of liquid crystal materials, namely cholesteric, nematic and smectic types. The invention of the present application relates in the preferred embodiment described below to use of either a nematic, cholesteric, smectic A, or ferroelectric (chiral smectic C*) liquid crystal material or to a combination of liquid crystal types. The various characteristics of the cholesteric, nematic and smectic types of liquid crystal material are described in the prior art.

For many years, a class of new liquid crystal materials has been manufactured by treating such materials with a polymeric material to form a polymer dispersed liquid crystal for use in the manufacture of displays or other devices. U.S. Pat. No. 3,872,050, issued to Benton, relates to a polyurethane/liquid crystal dispersion system, in which cholesteric liquid crystal is dispersed as discrete naked aggregates in a polyurethane film. U.S. Pat. No. 4,101,207, issued to Taylor, relates to a liquid crystal/polymer film which is formed by: 1) casting a polymer solution containing liquid crystal, or 2) mixing liquid crystal with a polymerizable monomer or prepolymer followed by polymerization. More recently, these technologies have been improved further by the use of more suitable liquid crystal and polymeric binder materials to fabricate the electronic displays and light shutters, for example. These technologies basically include two distinct methods an emulsion method and a phase separation method.

An example of an emulsion method is disclosed in U.S. Pat. No. 4,435,047, issued to Fergason. The encapsulated liquid crystal droplets, which are dispersed in a polyvinyl alcohol film, are opaque in the off state. However, they become transparent when an electric field is applied. The polymer liquid crystal film called nematic curvilinear aligned phase (NCAP) film is prepared by emulsifying liquid crystal material, generally a nematic type liquid crystal material, in aqueous polyvinyl alcohol. The emulsion is drawn down on an indium-tin oxide coated substrate, which is then laminated by another indium-tin oxide film after drying. This liquid crystal/polymer film based on a light scattering does not require the polarizers to function. However, this manufacturing process permits contamination by the impurities which are contained in the process' water and dispersing agents (e.g. polyvinyl alcohol or latex) to be transmitted to the liquid crystal material. In the Drzaic article, *Journal of Applied Physics*, Volume 60, No. 6, Sep. 15, 1986, at pages 2142–2148, it is reported that an aqueous based NCAP system is an interpenetrating network of liquid crystal in a polymer matrix, rather than an encapsulated liquid crystal. Furthermore, U.S. Pat. No. 4,707,080, issued to Fergason, relates to a plurality of liquid crystal volumes which are interconnected. In addition, U.S. Pat. No. 5,216,330, issued to Pearlman et al, relates to the encapsulation of a smectic phase liquid crystal material in a polymer matrix (known as NCAP). See also Drzaic et al article, SID 90 Digest, at pages 210–213.

EP 0238 626 relates to a phase separation method utilized to obtain a light modulating material. The material is prepared from an isotropic solution of liquid crystal and prepolymer, which can be a monomer or a mixture of a monomer and an oligomer. Under an ultraviolet or an electron beam irradiation, the liquid crystal droplets segregate from the insoluble polymer matrix. The liquid crystal droplets are then located in cavities within a continuous polymer matrix layer.

WO 85/04262 relates to liquid crystal droplets which are dispersed in an epoxy resin to form a new light modulating material. The film produced also exhibits an opaque characteristic in the off state, while exhibiting a clear characteristic when an electrical field is applied.

U.S. Pat. Nos. 3,499,702 and 3,551,026 relate to the incorporation of pleochroic dyes in liquid crystal materials, in order to enhance contrast. This is accomplished by the fact that pleochroic dyes align parallel to nematic liquid crystal director and respond to an electric field in a liquid crystal like manner.

In the Drzaic et al article, SID 92 Digest, at pages 571–574, it is reported that a dichroic based liquid crystal film prepared by NCAP technology demonstrates that there are possible applications, in portable high information density displays, without the requirement of backlighting. However, the device's useful life time is dependent upon capability of finding a dichroic dye with a long period of stability and the liquid crystal material's charge holding capability. The dichroic based NCAP film suffers problems due to the fact that the dye is exposed to moisture, air and ionic impurities existing in polymeric binder. As a result, dichroic dyes suffer stability problems.

For the polymer dispersed liquid crystal (PDLC) manufactured by a phase separation method, the liquid crystal material is dissolved in polymeric resin and placed between two indium tin oxide coated substrates and is irradiated by ultraviolet light or electron beam in order to cure the resin. The liquid crystal material used in a PDLC may be either nematic, cholesteric, or ferroelectric. See Drzaic et al article, SID 90 Digest, at pages 210–213; Crooker et al article, SID 90 Digest, at pages 214–216; Yang et al article, SPIE Liquid Crystal Displays and Applications, Volume 1257, 1990, at pages 60–67; Molsen et al article, SID 92 Digest, at pages 773–775; and Zyryadov et al article SID 92 Digest, at pages 776–777, for example. The optical films prepared by this method suffer some drawbacks as well. For instance, one of these drawbacks is the component in the system of liquid crystal/polymer are mutually soluble and can not be completely separated during phase separation. This causes a decrease in the liquid crystal/polymer film contrast, which specifically effect the dichroic based PDLC. This is due to the fact that only the dye dissolved in the liquid crystal droplets can exhibit the dichroic properties for the guest-host effect.

U.S. Pat. Nos. 4,285,720, 4,155,741, and 4,046,741 disclose a micro-encapsulation method by an interfacial polymerization of organic polyisocyanate intermediate to form a polyurea capsule. U.S. Pat. No. 4,138,362, issued to Vassiliades et al, relates to a method whereby the microcapsules are prepared by an interfacial cross linking of polyfunctional isocyanate dissolved in core materials and the dispersing agents contain recurring —$NH_2$, —NH, or hydroxy groups.

U.S. Pat. No. 4,193,889, issued to Baatz, relates to a method of micro-encapsulation with modified aliphatic polyisocyanates. However, Baatz does not disclose how to microencapsulate liquid crystal materials for display applications, where the capsule wall must be transparent and its refractive index must match that of the liquid crystal material and polymeric binder.

According to the present invention, the capsule wall refractive index is adjustable by an interfacial polymerization of polyurethane and polyurea structures and there also exists a highly cross-linked structure within the polymer film. Further, the capsule wall may be manufactured so as to be transparent, in order to be more suitable for use in an electronic display application.

SUMMARY OF THE INVENTION

This invention relates to a microcapsule comprising liquid crystal material encapsulated in polyurethane/polyurea or polyurea polymer walls. The liquid crystal material which is to be microencapsulated, may be either a nematic, cholesteric, smectic A, or ferroelectric (chiral smectic C*).

In another aspect this invention also relates to a composition for use in preparing microencapsulated liquid crystal material, comprising a liquid crystal material, a polyisocyanate, and a polyol or a polyamine. The starting materials necessary to form the polyurethane/polyurea or polyurea polymer walls to microencapsulate the liquid crystal material are produced by reacting a polyisocyanate, having at least two isocyanate groups (—NCO) and about 8 to 30 carbon atoms and is soluble in the liquid crystal material; and (B) a polyol or polyamine where the polyol is water soluble and contains at least two primary alcohol groups and the polyamine is also water soluble and contains at least two primary or secondary amino groups.

In still another aspect of this invention relates to a method of making a microencapsulated liquid crystal droplet with a capsule wall composed of a polyurethane/polyurea or polyurea polymer by the interfacial polymerization of a polyurethane or polyurea, wherein the liquid crystal material may contain a dichroic, pleochroic or isotropic dye.

Furthermore, the present invention relates to a method of preparing microencapsulated liquid crystal droplets, comprising the steps of (A) providing (1) a liquid crystal material containing a dichroic, a pleochroic, or isotropic dye, (2) a polyisocyanate and (3) a polyol or polyamine or both of them; and (B) interfacially polymerizing (2) and (3) to form a polyurethane/polyurea or polyurea polymer.

To optimize the contrast characteristics of a liquid crystal device comprised of microencapsulated liquid crystals, and more particulary, to avoid optical distortion, due to refraction of incident light passing from the encapsulating medium into the liquid crystal material and vice versa, the index of refraction of the encapsulating medium, binder and adhesive should be matched to the ordinary index of refraction of the liquid crystal material so as to be as much as possible the same. The closeness of the index matching will be dependent on the desired degree of contrast and transparency in the device, but the ordinary index of refraction of the crystal and the index of the encapsulating medium, dye, binder and adhesive will preferably differ by no more than 0.03, more preferably 0.01, especially 0.001.

The purpose of forming polyurethane linkage in the interfacial polymerization is designed to adjust capsule wall refractive index. In the absence of polyol and the presence of water, the —NCO group of polyisocyanate is hydrolyzed to $NH_2$ with the evolution of $CO_2$ and the formed $NH_2$ group reacts with free —NCO to form urea linkage. In this case only polyurea capsule wall film is formed. If a polyamine is added to the aqueous emulsifying solution, these chain extending agents react with —NCO group and also only polyurea capsule wall is formed. In order to modify the capsule wall structure, a polyol containing at least two primary OH groups may be added to the aqueous emulsifying solution to carry the polyurethane polymerization to compete with the polyurea polymerization derived from the —NCO and $NH_2$.

In yet another aspect the present invention relates to a device containing microencapsulated liquid crystal droplets. Such liquid crystal droplets may be substantially monodispersed, through separation by centrifuge. Devices in which such liquid crystal droplets may be used include, but are not limited to, TVs, computer display screens, and electronic display devices.

The present invention provides numerous benefits over the prior art. For example, the present invention incorporates dichroic, pleochroic, or isotropic dye into liquid crystal material which allows for enhanced display contrast by light absorption as well as light scattering. Further, the present invention allows for the production of a long-life, high contrast guest-host type of liquid crystal/polymer display which is suitable for reflective or trans-reflective mode personal computer and TV application. In addition, haze and viewing angle problems, that usually occur in the combination of different material with different refractive indices, is avoided by the present invention due to the ability of the present invention to allow for the matching of the refractive indices of the liquid crystal material, the microcapsule wall, the polymeric binder and the adhesive.

The wall refractive index may be adjusted by a number of methods. The first is by selecting the liquid crystal material, encapsulating material, polymeric binder and the adhesive so that their indices of refraction are substantially identical. In the first alternative, an epoxy resin can be added to the liquid crystal material and a water soluble hardener is added to the emulsifying solution. In the second alternative, a polycarboxylic acid chloride is added to the liquid crystal material and a water soluble polyamine is added to the emulsifying solution. These compounds are selected so that their refractive indices are matched with that of the liquid crystal material and the polymeric binder. In addition, the present microencapsulation method ensures the least probability of contamination of the liquid crystal material by the polymeric binder during the liquid crystal/polymer film preparation. This allows for the protection of the integrity of the liquid crystal material and dichroic, pleochroic, or isotropic dye enclosed in the capsule; to ensure that the device has a life time which will be long enough for use in a practical application.

Another advantage of the present invention is the incorporation of dichroic dye into the liquid crystal material which forms a guest-host display, where the dye is the guest and the liquid crystal material the host. As described previously, the dye incorporation enhances the display contrast because of the combination effect of light absorption and light scattering. When the guest-host display is unpowered it shows scattering and colored; when the display is powered, it shows a transparent and colorless state. Further the microencapsulation of the dichroic dye/liquid crystal material combination extends the lifetime of the display and provides a more stable display when compared to one produced with a NCAP guest host liquid crystal display.

Still another advantage of the present invention is the microencapsulated liquid crystal material can be stored for later use. This is due to the fact that the liquid crystal microcapsules are substantially more stable and thus are more easily handled to permit a higher degree of confidence when attempting to achieve a certain set of desired properties. Also, the present invention separates the microcapsules by centrifuging, which allows for the selection of microcapsules with a very small range of size variation. Therefore, the microcapsules obtained may be nearly monodispersed, thereby allowing the liquid crystal film produced to possess an improved multiplexibility, when compared to a film that contains a wide range of microcapsule sizes.

Finally, if a dichroic dye is chosen that is a primary color (blue, red or green) the resulting liquid crystal microcapsules can be utilized in producing a color filter by way of directly screen printing the microcapsules to the substrate.

An aspect of the invention relates to an article or liquid crystal device, comprising liquid crystal means capable of plural optical modes, responses, conditions or outputs, at least one of which is in response to a prescribed electromagnetic energy, electrodeless means for providing support for said liquid crystal means.

Another aspect relates to an article or liquid crystal device, comprising liquid crystal means capable of plural optical modes, responses, conditions or outputs, said liquid crystal means having memory to maintain for a prescribed an optical mode, response, condition or output absent further input, means for supporting said liquid crystal means, and means, at least part of which is partly supported by said means for supporting or said liquid crystal means, for applying to the liquid crystal means an input to cause an optical mode, response, condition or output.

Another aspect relates to an article or liquid crystal device, comprising encapsulated liquid crystal means capable of plural optical modes, responses, conditions or outputs, said liquid crystal means including containment medium and liquid crystal in volumes formed in the containment medium, the containment medium being formed by interfacial reaction, and means for providing support for said liquid crystal means.

Another aspect relates to an article or liquid crystal device, comprising microencapsulated liquid crystal material having memory, and support means for supporting said material, said material being responsive to thermal energy, heat or temperature occurrence to provide a prescribed output representative of such occurrence.

Another aspect relates to a method of making a liquid crystal article or device of microencapsulated liquid crystal, comprising printing microencapsulated liquid crystal.

Another aspect relates to a method of making a liquid crystal article, comprising microencapsulating liquid crystal, and printing the microencapsulated material onto a material.

Another aspect relates to a method of indicating the exceeding of a temperature condition or the results of such exceeding, comprising setting a microencapsulated liquid crystal device to a condition representative of such temperature condition not having been exceeded, selecting the microencapsulated liquid crystal device to respond the exceeding of such temperature condition and to have memory to maintain the results of such response to maintain such results although the temperature condition returns to a temperature below such exceeded temperature.

Another aspect relates to a label article or like device, comprising liquid crystal means for providing at least two distinguishable outputs, said liquid crystal means including liquid crystal in a containment medium, said liquid crystal means having memory.

Another aspect relates to a blackboard or marker board, comprising liquid crystal means for providing at least two distinguishable outputs, said liquid crystal means including liquid crystal in a containment medium, said liquid crystal means having memory.

Another aspect relates to a method of labeling a product, comprising applying to the product a label comprising liquid crystal means for providing at least two distinguishable outputs, said liquid crystal means including liquid crystal in a containment medium, said liquid crystal means having memory.

Another aspect relates to a method of displaying information for viewing or projection, comprising setting a liquid crystal means having memory and capable of providing at least two distinguishable outputs to one output, and applying to selected parts of said liquid crystal means a prescribed input to cause another distinguishable output, the liquid crystal means maintaining for a prescribed time such another distinguishable output.

Another aspect relates to a reusable paper or like medium, comprising a substrate and liquid crystal means on said substrate for providing at least two distinguishable outputs, said liquid crystal means having memory.

Another aspect relates to an apparatus for providing a color response, comprising, liquid crystal means having memory and including a dye, said liquid crystal means having plural distinguishable optical responses, means for supporting said liquid crystal means, color means associated with said means for supporting, said liquid crystal means being cooperative with said color means to provide a combined color output representative of at least one of such distinguishable optical responses.

Another aspect relates to a method of aligning a liquid crystal material or causing a prescribed viewably discernable optical mode or condition of liquid crystal material, the liquid crystal material being in a containment medium and having memory, comprising effecting relative movement between the liquid crystal material in a containment medium and means for applying electromagnetic energy to the liquid crystal material in a containment medium, and applying electromagnetic energy to the liquid crystal material.

Another aspect relates to a method of aligning a liquid crystal material or causing a prescribed optical mode or condition of liquid crystal material, the liquid crystal material being in a containment medium and having memory, comprising spraying electrical charge on the liquid crystal material in a containment medium.

Another aspect relates to a method of aligning a liquid crystal material or causing a prescribed optical mode or condition of liquid crystal material, the liquid crystal material being in a containment medium and having memory, comprising effecting relative movement between the liquid crystal material in a containment medium and a print head, and using the print head applying energy to the liquid crystal material in a containment medium.

These and other objects, features, aspects and advantages of the invention will become more apparent as the following description proceeds.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

Although the invention is shown and described with respect to certain embodiments, it is obvious that equivalents and modifications will occur to those skilled in the art upon the reading and understanding of the specification. The present invention includes all such equivalents and modifications, and is limited only by the scope of the claims.

BRIEF DESCRIPTION OF THE DRAWINGS

FIGS. 5 and 6 are schematic illustrations of apparatus for printing onto a substrate having a microencapsulated liquid crystal coating.

FIGS. 7 and 8 are schematic top and side elevation views of a substrate coated with microencapsulated liquid crystal material.

FIGS. 9 and 10 are schematic top and side elevation views of a substrate partially coated with microencapsulated liquid crystal material.

FIGS. 11 and 12 are schematic top and side elevation views of a substrate on which an image is provided and which is coated with microencapsulated liquid crystal material.

FIG. 13 is a schematic illustration of apparatus for applying electric field to a substrate with microencapsulated liquid crystal.

FIG. 14 is a schematic illustration of thermal printer apparatus for writing to a substrate coated with microencapsulated liquid crystal.

FIGS. 15 and 16 are front and side elevations of blackboard/marker board with coating of microencapsulated liquid crystal.

DETAILED DESCRIPTION OF THE PREFERRED EMBODIMENTS

Figure 1:
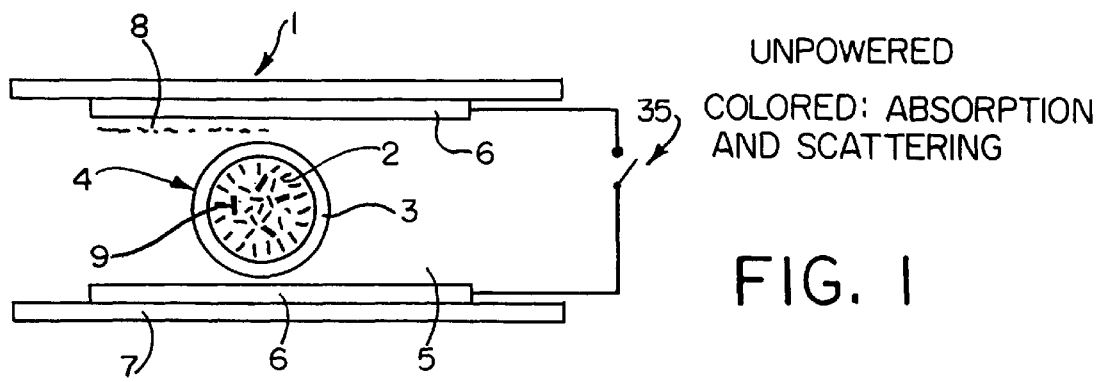
FIG. 1 is an illustration of a preferred liquid crystal display, in an unpowered state, made utilizing a microencapsulated liquid crystal material as created in accordance with the present invention.

As discussed above, the present invention relates to composition comprising a liquid crystal material, polyisocyanate, and a polyol or polyamine. In one embodiment, from about 0.01 to about 0.16, or from about 0.02 to about 0.1 2, or from about 0.04 to about 0.08 parts polyisocyanate to each part liquid crystal. The polyamine, when present, is in an amount of from about 0.0034 to about 0.28, or from about 0.0051 to about 0.21, or from about 0.0068 to about 0.14 parts polyamine to each part liquid crystal. The polyol, when present, is in an amount from about 0.0063 to about 0.26, or from about 0.0094 to about 0.20, or from about 0.0126 to about 0.13 parts polyol to each part liquid crystal. Typically the water is present in an amount from about 1.19 to about 15.8, or from about 1.78 to about 11.9, or from about 2.38 to about 7.9 parts water to each part liquid crystal. However, the amount of water present does not affect polymerization. The water is present in order to dissolve the polyamine and/or polyol. Some of the water which is added to the reaction process actually comes from the addition of the polyamine and/or polyol since these reactants are in aqueous solutions. Some extra water may be added to compensate for the water lost to evaporation.

According to the present invention, the microencapsulated liquid crystal is prepared by an interfacial polymerization, e.g., polyaddition/polycondensation, to form either a polyurethane/polyurea or polyurea thin capsule wall which encloses the dispersed liquid crystal droplets. The polymers are prepared by reacting a polyisocyanate and at least one of a polyol or a polyamine.

The polyisocyanate contains from about 2 to about 8, or from about 2 to about 4, preferably 3 isocyanate (—NCO) groups. The polyisocyanate is capable of forming capsule wall, with a high cross linked density. The polyisocyanate typically contain from about 6 to about 30, or from about 8 to about 24, or from about 8 to about 24 carbon atoms. Here as well as elsewhere in the specification and claims, the range and ratio limits may be combined. The polyisocyanate may be aliphatic or aromatic.

The first substance (A) necessary to form the microcapsules can be any one of a number of commercially available starting materials, for example, Desmodur N-100 and N-3200 which are mainly a trimer of 1,6-hexamethylene diisocyanate and contain at least one biuret structure. Another possible starting material is Desmodur N-3390 which has an isocyanurate structure also derived from 1,6-hexamethylene diisocyanate. These materials are all available from Bayer Corporation. Their structures are given below:

Desmodur N-3200

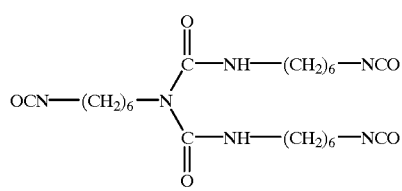

Desmodur N-3390

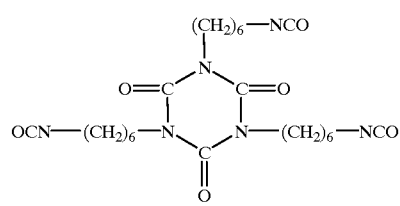

The other trifunctional isocyanate is an adduct of trimethylolpropane and 1,6-hexamethylene diisocyanate with the following structure:

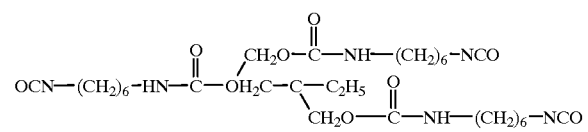

Other difunctional isocyanates can be utilized as starting materials. They are 1,6-hexamethylene diisocyanate, bis-(4-isocyanatocyclohexyl)methane, isophorone diisocyanate, tolylene-2,4-diisocyanate, tolylene-2,6-diisocyanate, diphenylmethane-4,4-diisocyanate, all available from Bayer Corporation. In one embodiment, the polyfunctional isocyanates may be soluble in liquid crystal material and do not react with the liquid crystal material or other components found in the liquid crystal material.

The second substance (B) necessary to the formation of a film which surrounds the liquid crystal material's droplets is a polyol or a polyamine (or both). In one embodiment, the starting materials are chosen for their low molecular weight and high solubility in water. From about 0.25 to about 10, or from about 0.5 to about 5, or from about 0.75 to about 2 parts of polyol and/or polyamine are reacted to each part polyisocyanate. Alternatively, from about 0.13 to about 26.5, or from about 0.2 to about 20.0, or from about 0.26 to about 13.5 equivalents of polyol and/or polyamine are reacted to each equivalent of isocyanate.

If a water soluble polyol contains at least two primary alcohol groups. The polyols generally contain from about 2 to about 8, or from about 2 to about 4 hydroxyl groups. The polyols typically contain from about 2 to about 18, or from about 2 to about 12 carbon atoms. The polyol may include polyhydric alkanolamine, such as ethanolamine and tris (hydroxymethyl)aminomethane. The alkanolamine typically contains two to three hydroxyl groups. The polyol may be a sulfur containing polythiol, such as a thiodiethanol. Examples of useful polyols include any one of a number of commercially available polyols, which include diethylene glycol, 2,2'-thiodiethanol, 2-mercaptoethylsulfide, 2-mercaptoethylether, triethylene glycol, 2-methylpropane-1,3-diol, 2-ethylpropane-1,3-diol, 2-n-propylpropane-1,3-diol, 2-n-butylpropane-1,3-diol, 2-methyl-2-n-butylpropane-1,3-diol, diethanolamine, triethanolamine, N-n-butyldiethanolamine, N-ethyidiethanolamine, N-methyldiethanolamine, tris(hydroxymethyl) aminomethane, trimethylolpropane, pentaerythritol, 1,4-butanediol, 1,6-hexanediol, 2,2-bis(hydroxymethyl) propionic acid, dimethylolmelamine, trimethylolmelamine, hexamethylolmelamine and mixtures thereof. Triethanolamine, N-n-butyldiethanolamine, N-ethyidiethanolamine, N-methyldiethanolamine, can serve as tertiary amine catalyst as well as film-forming polyol.

The water soluble polyamines may contain from about 2 to about 12, or from about 2 to about 6, or from about 2 to 4 nitrogen atoms. The polyamine may be alkylene polyamines which have alkylene groups having from about two to about six carbon atoms. Examples of useful polyamines include ethylenediamine, 1,4-butanediamine, 1,6-hexanediamine, diethylenetriamine, triethylenetetramine, tetraethylenepentamine, melamine or mixtures thereof.

In one embodiment, the reaction occurs in the presence of an aqueous solution of polyvinyl alcohol (PVA). Typically the aqueous solution has a concentration of about 5% to about 30%, or from about 7.5% to about 25%, or about 10% by weight PVA. Typically the aqueous solution is present in an amount from about 35% to about 95%, 50% to about 90%, or from about 65% to about 88% by weight.

Specifically the liquid crystal material may be, for example, either a nematic, cholesteric, or smectic liquid crystal material. Some commercially available examples of such are: FEE 1 (cyanoester mixture, available from Har Cherrakel Labs); E49 (available from BDH Chemicals, England); or S-3 (also available from BDH Chemicals, England).

In one embodiment, a small amount of a dopant, which is incorporated into the chosen liquid crystal material, is added to the liquid crystal material in order to improve the microencapsulation process or to enhance the microcapsules properties. The dopant may be, for example, a surfactant, a chiral compound, or an aligning agent. The surfactant may be, for example, Igepal CO-210, CO-420 or CO-430 (all available from GAF Corporation). The chiral compound may be, for example, C15 or CB15 (both available from BDH Chemicals, England). The aligning agent may be, for example, n-octadecyldimethyl[3(trimethoxysilyl)propyl]

ammonumchloride, n-octyldecyltriethoxysilane, or (N,N-dimethyl-3-aminopropyl)trimethoxysilane available from Petrarch Systems.

In still another embodiment, the tertiary amine DABCO (an abbreviation for 1,4-diazabicyclo[2.2.2]octane, also called triethylenediamine), which is available from Aldrich Chemical Co., is used as a catalyst to enhance the reation rate.

In still another embodiment, an emulsifying agent and dispersing agent may be used. The compound chosen may serve both functions. The compound may be, for example, polyvinyl alcohol (AIRVOL V165, V203, V205, and V325, all available from Air Products or EVANOL 71-30 available from duPont). In still another embodiment, a wetting agent is utilized in order to obtain a uniform coating on the indium tin oxide substrate surface. The wetting agent may be, for example, DC5098 (also known under the trade name Dow Corning 92-5098, which is a nonhydrolyzable silicon glycol copolymer).

When an aqueous solution, containing a mixture of one of the above combinations, is added to an emulsion of a liquid crystal material in aqueous emulsifying agent (e.g. Airvol V205, available from Air Products) the combination undergoes polymerization, such as polyaddition, with the polyfunctional isocyanate around the liquid crystal material's droplet surface, creating a microencapsulated liquid crystal droplet. Such a reaction may be accelerated by the addition of a tertiary amine. The tertiary amines include such as triethylenediamine (DABCO), triethylamine, tetramethyl-1, 3-butanediamine, N-methylmorpholine and mixtures thereof. In another embodiment, the reaction can be accelerated with a tin catalyst. The tin catalysts include dibutyltin diacetate, tributyltin acetate, dibutyltin dilaurate or mixtures thereof. The amount of tin catalyst used in the reaction may range between 0 and about 1%, or from about 0.1% to about 0.75% by weight of the total reaction mixture.

The polyisocyanate, while undergoing stirring, is mixed with the liquid crystal material. Sometimes the application of heat is necessary in order to assist in the mixing. Such an application of heat ensures a homogenous mixture. The temperature of the heating is typically from about 25 to about 90° C., preferably about 50 to about 70° C. The aqueous emulsifying solution is placed in a long neck beaker and maintained in a warm water bath at 50° C. The polyisocyanate/liquid crystal mixture is added to emulsifying solution, while it is undergoing vigorous stirring. The polyisocyanate/liquid crystal mixture is added to the emulsifying solution at a concentration of about 10 to about 70%, preferably 50%. The resulting solution is allowed to stand, while undergoing constant stirring, for two to three minutes or until the desired liquid crystal droplet size is obtained. As stated, the emulsion is stirred continuously at a moderate speed of about 2500 rpm to about 6500 rpm while its temperature is maintained in the range of about 40 to about 90° C., or from about 50 to about 60° C. The mixture is maintained at this temperature until the reaction is complete, which is from about 6 to about 12 hours, or about 8 to about 11 hours. During the reaction, the polyol and/or polyamine and catalyst is, if used, are added. Such an addition may be done separately or as a combined mixture. At the end of the polymerization, aqueous $NH_4OH$ solution is added to post-cure the active residual —NCO group. Usually the reaction is completed in about 6 to about 12 hours, or from about 8 to about 10 hours.

The aqueous emulsifying solution containing the excessive reactants is separated from the liquid crystal microcapsules by a centrifuging. The centrifuging is accomplished in a IEC HN-SII centrifuge. The centrifugation is generally carried out at a speed of 500 rpm to about 4500 rpm for about 10 to about 30 minutes. Typically only one set of centrifugation is required. However, multiple steps of centrifugation may be used to separate the aqueous emulsifying solution from the liquid crystal microcapsules. Through the use of different centrifuging speeds the capsule size distribution can be narrowed to nearly monodispersed microcapsules in different size ranges. The size of the liquid crystal microcapsules obtained by centrifuging is about 1 to about 9 microns, or from about 2 to about 8 microns, or more preferably from about 4 to about 7 microns.

The purified microcapsule wet cake can be stored for later application or can be used directly in optical film fabrication. For use the wet cake is thoroughly mixed with aqueous polymeric binder and small amount of wetting agent. The polymeric binder is typically used at a concentration of about 10 to about 30%, preferably 20%. The wetting agent is typically used at a concentration of about 0.3 to about 0.6%. After the removal of any air bubbles, the coating material is ready for the optical-film preparation. It is coated on a indium tin oxide polyester film by a doctor blade with a wet film thickness of about 1 mil (24 micron). The wet film is first air dried and then heated to remove the moisture. A layer of ultraviolet curable adhesive is applied to the dried coating film and another indium tin oxide polyester film is laminated on to it with a roller. The film is exposed under the ultraviolet light, in order to cure the adhesive, thus forming a liquid crystal/polymer film. The liquid crystal droplets are now microencapsulated by a very thin capsule wall of about 0.01 to about 0.1 micron.

The fabrication of pleochroic based liquid crystal/polymer film is the same as the above-mentioned process. The pleochroic dye used should be inactive to the chosen polyisocyanate film former. A pleochroic dye possessing the following characteristics is preferred: a high order parameter; high extinction coefficient; high photo stability; and high solubility in the chosen liquid crystal material.

The haze and obscurity are measured by using XL-211 Hazegard Hazemeter (available from Pacific Scientific). The visual 10% threshold voltage and 90% saturation voltage are measured at 60 Hz and sine wave.

Figure 2:
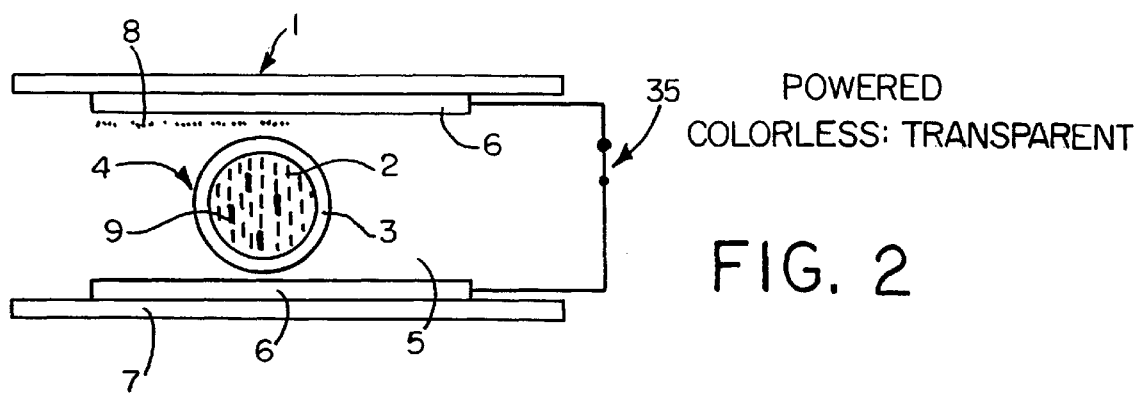
FIG. 2 is an illustration of a preferred liquid crystal display, in a powered state, made utilizing a microencapsulated liquid crystal material as created in accordance with the present invention.

Referring now in detail to the drawing, wherein like numerals designate like parts in the several figures, and initially FIG. 1 illustrates a preferred liquid crystal/polymer film display 1 of the present invention consisting of the liquid crystal droplets 2 microencapsulated by the capsule wall 3 to form the discrete liquid crystal microcapsules 4, which are dispersed in polymeric binder 5 and are coated on the indium tin oxide 6 coated substrate 7. A layer of adhesive 8 is applied, then it is laminated with another indium tin oxide 6 coated substrate 7 to form a liquid crystal/polymer film 1. In the unpowered state the mismatch of refractive index among the liquid crystal 2, capsule wall 3, adhesive layer 8 and binder 5 cause the film to scatter the light. As a result, the optical-film 1 is opaque or translucent. Turning now to FIG. 2, the device from FIG. 1 is depicted in a powered state. In this state the director of liquid crystal 2 align parallel to the applied field and the optical-film becomes clear and transparent. When the liquid crystal is impregnated with a pleochroic dye 9, the molecular long axis of dye will align parallel to nematic director. The optical-film 1 will then show light absorption as well as light scattering in the unpowered state (FIG. 1) and transmit the light in the powered state (FIG. 2). This enables for an enhanced contrast of the liquid crystal/polymer film.

The following examples relate to microencapsulated liquid crystal material. Unless the context clearly indicates otherwise, in the examples and throughout the specification and claims, amounts and ratios are by weight, temperature is in degrees celsius, and pressure is atmospheric.

EXAMPLE 1

Desmodur N-3200 (0.25 g), available from Bayer Corporation, was dissolved in 5 g of FEE1 (cyanoester mixture, available from Har Cherrakel Labs) at 60° C., while undergoing stirring. The solution was then poured into a solution of 17 g of 10% polyvinyl alcohol (Airvol V205, available from Air Products), which was undergoing constant stirring, and was emulsified at 50 to 55° C., to obtain the particle size of 1 to 7 microns. The stirring speed was then reduced and the reaction was continued at 55° C. for 10 hours. During the reaction, 0.40 g of 10% DABCO (available from Aldrich Chemical Co.) and 0.34 g of 10% ethylenediamine (available from Aldrich Chemical Co.) were added to the solution. After the reaction was complete, 0.37 g of 10% $NH_4OH$ was added to the solution, then the solution was allowed to stand overnight, without heating or stirring. The resulting slurry was then purified using IEC HN-SII centrifuge to obtain narrow particle size distribution of 4 to 7 microns. The microencapsulated liquid crystal wet cake was re-dispersed in aqueous polymeric binder (e.g., Airvol V205 or NeoRez R967 latex, the later is available from Zeneca Resins) containing wetting reagent (DC5089) and was drawn down using a doctor blade (1 mil thick, available from Gardner Technical Service) on the indium tin oxide coated polyester sheet (available from Southwest Technologies). After allowing the film to dry, a layer of adhesive (e.g., NOA68, a polyurethane adhesive, available from Norland Optical Inc.) was applied and another indium tin oxide polyester sheet was laminated on to form a display film with a film thickness about 12 micron. The PVA-dispersed film exhibited an opaque characteristic in the OFF state and turned to semi-transparent at 60 Volts and 60 Hz with 90% transmission.

EXAMPLE 2

Desmodur N-3200 (0.18 g) was dissolved in 3 g of E49 (available from BDH Chemicals, England) at 80° C., which was undergoing constant stirring. The mixture was then poured into a solution of 18 g of 10% PVA, also undergoing stirring, and emulsified using Dyna-Mix stirrer (available from Fisher Scientific) at 50° C. and 6500 rpm for 2 minutes, in order to obtain a particle size of 2 to 8 microns. The stirring speed was reduced to 2500 rpm and the reaction was continued at 55° C. for eight hours. During the reaction, 0.16 g of 50% triethylamine (available from Aldrich Chemical Co.), and 0.31 g of 10% ethylenediamine were added in two to four portions at 0.5 to 1 hour intervals. After 10-hour reaction, 0.37 g of 10% $NH_4OH$ was added to the solution, which was then allowed to stand overnight, without heating or stirring. The purification of the resulting slurry and the film preparation were the same as previously described. The PVA-dispersed film showed some haze at 60 to 70 Volts with 90%,transmission.

EXAMPLE 3

Desmodur N-3200 (0.24 g) was dissolved in 4 g of FEE1 at 60° C., which was undergoing constant stirring. The mixture was poured into a solution of 17 g of 10% PVA, also undergoing stirring, and emulsified at 55° C. and 6500 rpm for 2 minutes. The particle size was about 1 to 9 microns. The reaction was continued at 2500 rpm and 55° C. for 11 hours. During the reaction, 0.40 g of 10% DABCO and 0.51 g of diethylene glycol (available from Aldrich Chemical Co.) were added to the solution in three portions at half an hour interval. After the reaction was complete, 0.37 g of 10% $NH_4OH$ was added to the solution. The resulting slurry was allowed to stand at room temperature, without heating or stirring. After purification by centrifugation, the wet cake was re-dispersed in NeoRez R967 and 20% PVA solution, respectively. The film prepared with NeoRez R967 showed some haze at 60 to 70 Volts with 90% transmission. While the film prepared with 20% PVA showed low haze at 30 to 40 Volts with 90% transmission.

EXAMPLE 4

Desmodur N-3200 (0.15 g) was added to 2.5 g of E49, the resulting mixture was then heated at 80° C., which was undergoing constant stirring, for 10 minutes and then poured into a solution of 18 g of 10% PVA, also undergoing stirring, and emulsified at 55° C. and 6500 rpm for 2 minutes. The particle size was about 1 to 6 microns. The reaction was continued at 2500 rpm and 55° C. for 10 hours. During the reaction, 0.60 g of 10% DABCO, 0.51 g of diethylene glycol, 0.07 g of dibutyltin diacetate (available from Aldrich Chemical Co.), and 0.20 g of 10% ethylenediamine were added to the solution in four portions at 0.5 to 1 hours intervals. After the reaction was complete 0.37 g of 10% $NH_4OH$ was added to the solution. The resulting slurry was again allowed to stand at room temperature, without heating or stirring. After purification by a centrifuge, the wet cake was re-dispersed in a solution of 20% PVA. The PVA prepared film showed low haze at 30 to 40 Volts with 90% transmission.

EXAMPLE 5

A mixture of 0.125 g of Desmodur N-3200 and 2.5 g of E49 was heated, which was undergoing constant stirring, to form a homogenous solution. The solution was then poured into a solution of 20 g of 10% PVA, also undergoing stirring. The mixture was then emulsified at 50° C. and 6500 rpm for 2.5 minutes. The particle size was about 1 to 5 microns. The reaction was continued at 2500 rpm and 50° C. for 8 hours. During the reaction, 0.64 g of 10% DABCO, 0.53 g of 2-methylpropane-1,3-diol (available from Aldrich Chemical Co.), and 0.11 g of dibutyltin diacetate (available from Aldrich Chemical Co.) were added to the solution. After the reaction was complete, 0.30 g of 10% $NH_4OH$ was added into the reaction mixture. The resulting slurry was then allowed to stand overnight. The slurry was then purified by a centrifuge. The PVA-dispersed film showed low haze at 35 Volts with 90% transmission.

EXAMPLE 6

A mixture of 0.15 g of Desmodur N-3200 and 2.5 g of E49 was heated to 80° C. for 10 minutes, which was undergoing constant stirring. The mixture was added into a solution of 20 g of 10% PVA, also undergoing stirring, and emulsified at 50° C. and 6500 rpm for 2 minutes. The particle size was about 1 to 6 microns. The reaction was continued at 3000 rpm and 50° C. for 10 hours. During the reaction, 1.00 g of 10% DABCO, 0.65 g of triethanolamine, 0.11 g of dibutyltin diacetate, and 0.20 g of 10% ethylenediamine were added to the solution. After the reaction was complete, 0.37 g of 10% $NH_4OH$ was added to the solution, and the heating was discontinued. The resulting slurry was purified using a centrifuge. The PVA-dispersed film showed low haze at 30 Volts with 90% transmission.

EXAMPLE 7

A mixture of 0.125 g of Desmodur N-3200 and 2.5 g of E49 was heated, which was undergoing constant stirring, to make a homogenous solution. The mixture was then poured into a solution of 20 g of 10% PVA, also undergoing stirring, and emulsified at 50° C. and 6500 rpm for 2 minutes. The particle size was about 1 to 5 microns. The stirring speed was turned down to 2500 rpm and the reaction was continued at 50° C. for 8 hours. During the reaction, 0.64 g of 10% DABCO, 0.83 g of triethylene glycol (available from Aldrich Chemical Co.), 0.05 g of dibutyltin diacetate, and 0.17 g of 10% ethylenediamine were added to the solution in portions, at intervals. After the reaction was complete, 0.37 g of 10% $NH_4OH$ was added to the reaction mixture. The resulting slurry was kept at room temperature overnight and purified using a centrifuge. The PVA-dispersed film showed some haze at 40 Volts with 90% transmission.

EXAMPLE 8

A mixture of 0.125 g of Desmodur N-3200 and 2.5 g of E49 was heated, which was undergoing constant stirring, to make a homogeneous solution. The mixture was poured into a solution of 20 g of 10% PVA, also undergoing stirring, and emulsified at 50° C. and 6500 rpm for 2 minutes. The particle size is about 1 to 6 microns. The emulsion was run at 50° C. and 2500 rpm for 8 hours. During this period, 0.64 g of 10% DABCO, 0.50 g of triethanolamine (available from Aldrich Chemical Co.) and 0.07 g of dibutyltin diacetate were added to the solution in portions at intervals. After the reaction was complete, 0.37 g of 10% $NH_4OH$ was added to the solution. The resulting slurry was allowed to stand overnight at room temperature. The slurry was then purified using a centrifuge. The PVA-dispersed film showed low haze at 30 Volts with 15–90% transmission.

EXAMPLE 9

A mixture of 0.125 g of Desmodur N-3200 and 2.5 g of E49 was heated, which was undergoing constant stirring, to make a homogenous solution. The mixture was poured into a solution of 10 g of 10% PVA, also undergoing stirring, and emulsified at 50° C. and 6750 rpm for 2 minutes. The particle size was in the range of 1 to 7 microns. The emulsion was kept at 50° C. and 2500 rpm for 10 hours. During this period, 0.96 g of 10% DABCO and 0.72 g of 2-methyl-2n-butylpropane-1,3-diol (available from Aldrich Chemical Co.) were added to the solution in four portions, at one hour intervals. After 10 hours, 0.37 g of 10% $NH_4OH$ was added to the solution. The resulting slurry was kept at room temperature overnight. The slurry was then purified using a centrifuge to obtain near mono-dispersed capsule size. The PVA-dispersed film showed some haze at 40 Volts with 90% transmission.

EXAMPLE 10

A mixture of 0.125 g of Desmodur N-3200 and 2.5 g of E49 was heated, which was undergoing constant stirring, to make a homogenous solution. The mixture was poured into a solution of 20 g of 10% PVA, also undergoing stirring, and emulsified at 50° C. and 6500 rpm for 2 minutes. The particle size was about 1 to 6 microns. The emulsion was kept at 50° C. and 2500 rpm for 10 hours. During this period, 0.72 g of 10% DABCO, 0.75 g of N-n-butyldiethanolamine (available from Aldrich Co.), and 0.20 g of 10% ethylenediamine were added to the solution in portions, at intervals. After 10 hours, 0.37 g of 10% $NH_4OH$ was added to the solution. The resulting slurry was kept at room temperature overnight. The slurry was then purified using a centrifuge to obtain near mono-dispersed capsule size. The PVA-dispersed film showed some haze at about 40 Volts with 90% transmission.

EXAMPLE 11

A mixture of 0.1 g of D37 (available from BDH Chemicals) in 5 g of FEE1 was heated, which was undergoing constant stirring, for 2 hours and then kept at room temperature for six more hours. The resulting solution was filtered through 0.2 micron PTFA membrane (available from Aldrich Chemical Co). A mixture of 0.18 g of Desmodur N-3200 and 3 g of D37/FEE1 was heated, also while undergoing stirring, for 10 minutes. The resulting solution was then poured into a solution of 20 g of 10% PVA, also undergoing stirring. The resulting mixture was then emulsified at 50° C. and 6500 rpm for 2 minutes.

The particle size was about 1 to 7 microns. The reaction was continued at 50° C. and 2500 rpm for 10 hours. During this period, 0.72 g of 10% DABCO and 0.51 g of diethylene glycol were added to the solution in portions, at intervals. After the reaction was complete, 0.37 g of 10% $NH_4OH$ was added to the mixture. The resulting slurry was kept at room temperature overnight and purified using a centrifuge. The PVA-dispersed film showed low haze at 30 to 40 Volts with 90% transmission and a good contrast.

EXAMPLE 12

A mixture of 0.09 g of S 428 (a black dye mixture, available from Mitsui Toatsu Chemicals) in 6 g of E49 was heated, which was undergoing constant stirring, for 2 hours. The resulting solution was then kept at room temperature overnight. The solution was filtered through 0.2 microns PTFA membrane (available from Aldrich Chemical Co.). A mixture of 0.138 g of Desmodur N-100 and 2.3 g of S 428/E49 was heated, which was undergoing constant stirring, for 15 minutes and then poured into a solution of 20 g of 10% PVA, also undergoing stirring. The resulting mixture was then emulsified at 50° C. and 6500 rpm for 2 minutes. The particle size was about 1 to 6 microns. The reaction was continued at 50° C. and 2500 rpm for 10 hours. During this period, 0.60 g of 10% DABCO, 0.75 g of triethanolamine, 0.34 g of diethylene glycol, and 0.07 g of dibutyltin dilaurate (available from Aldrich Chemical Co.) were added to the solution in portions, at intervals. After the reaction was complete, 0.37 g of 10% $NH_4OH$ was added to the solution. The resulting slurry was kept at room temperature overnight and then purified using a centrifuge to obtain a narrow capsule size distribution. The median volume size was 3.25 microns which was measured using Coulter LS 230 particle size analyzer (available from Coulter Corporation, Scientific Instruments). The dichroic based liquid is crystal/polymer film was prepared with the same method as previously described (page 12 lines 17 to 29). The transmission and % haze were measured using XL-211 Hazegard Hazemeter (available from Pacific Scientific). The PVA-dispersed film showed low haze at 35 Volts with 90% transmission.

Figure 3:
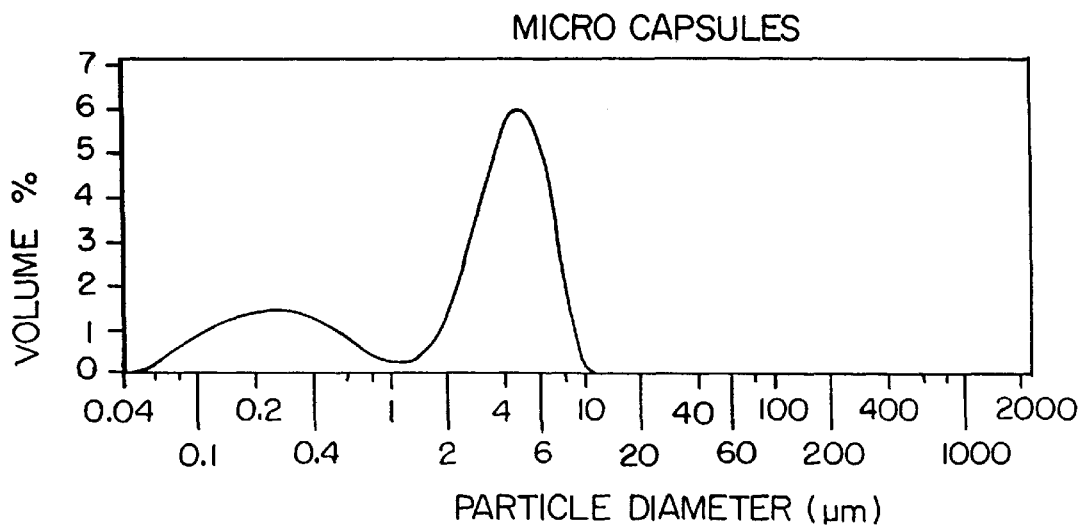
FIG. 3 is a graphical representation of the microcapsule particle size (in $\mu$m which is equal to microns) of the product prepared by the method disclosed in Example 12.
Figure 4A:
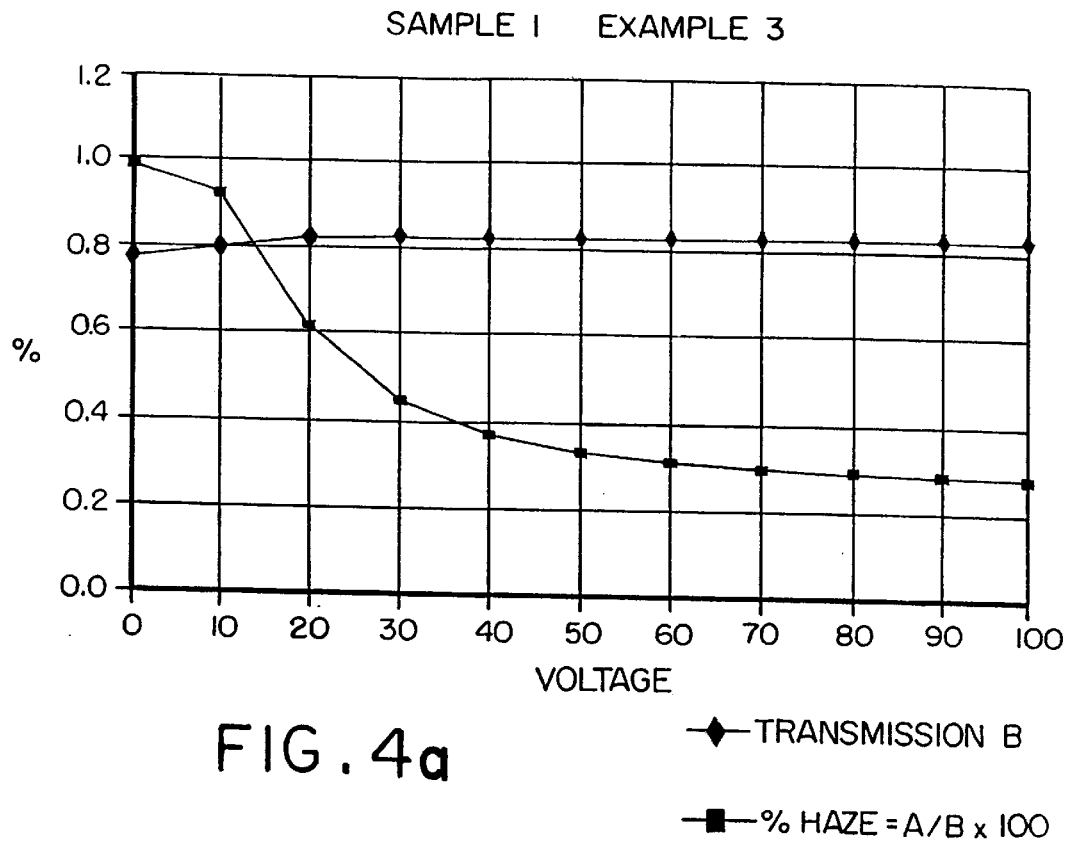
FIG. 4A is a graphical representation of the Transmission (♦) and % Haze (●) for Example 3, which is measured at a given voltages and 60 Hz.
Figure 4B:
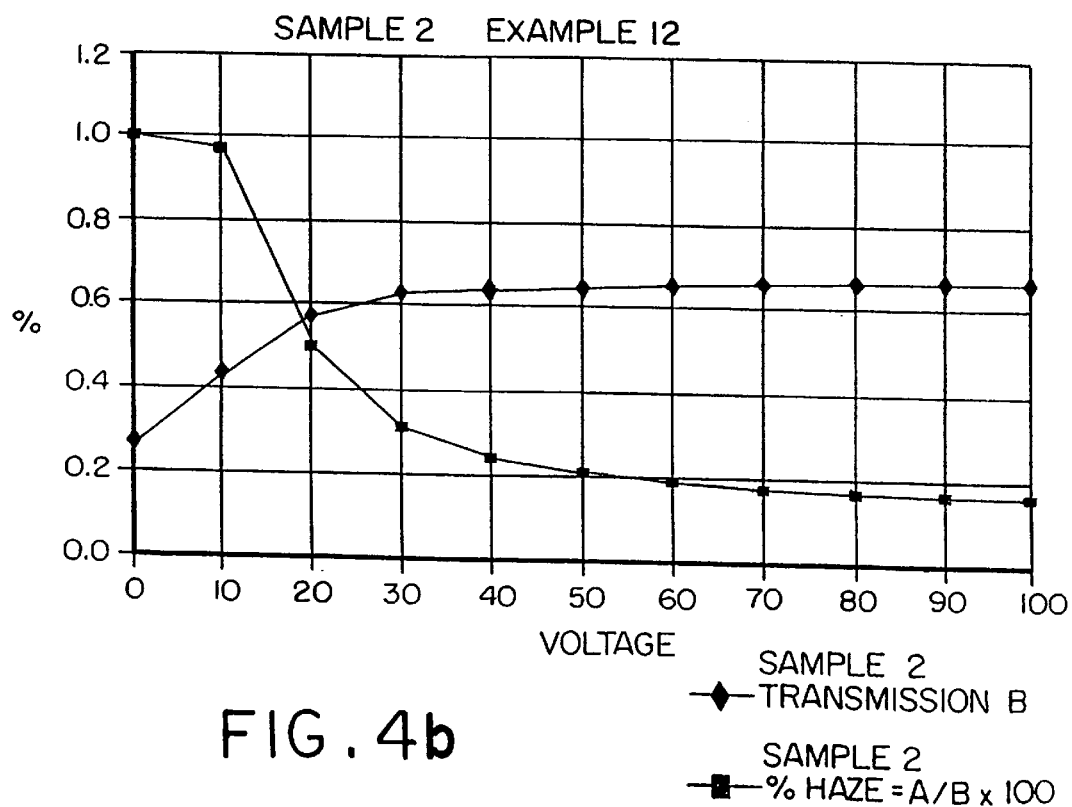
FIG. 4B is a graphical representation of the Transmission (♦) and % Haze (●) for Example 12, which is measured at a given voltages and 60 Hz.

The following Table 1 shows a data obtained from the samples of Example 3 and 12 using XL-211 Hazegard Hazemeter. FIG. 3 depicts a Particle Diameter Distribution graph from the sample of Example 12. FIGS. 4A and 4B depict a graphical representation of the Transmission (♦) and % Haze (●) from the data shown in Table 1.

TABLE I

| | Example 3 | | | Example 12 | | |
|---|---|---|---|---|---|---|
| Voltage | Open Position A | Transmission B | % Haze = A/B × 100 | Open Position A | Transmission B | % Haze = A/B × 100 |
| 0 | 78.10% | 78.90% | 98.99% | 27.60% | 27.60% | 100.00% |
| 10 | 74.10% | 79.80% | 92.86% | 42.40% | 43.60% | 97.25% |
| 20 | 50.00% | 81.10% | 61.65% | 29.60% | 58.30% | 50.77% |
| 30 | 37.00% | 81.80% | 45.23% | 19.80% | 61.90% | 31.99% |
| 40 | 30.90% | 82.10% | 37.64% | 15.80% | 64.10% | 24.65% |
| 50 | 27.80% | 82.30% | 33.78% | 13.70% | 65.10% | 21.04% |
| 60 | 26.00% | 82.50% | 31.52% | 12.40% | 65.90% | 18.82% |
| 70 | 24.80% | 82.50% | 30.06% | 11.70% | 66.30% | 17.65% |
| 80 | 24.10% | 82.70% | 29.14% | 11.30% | 66.70% | 16.94% |
| 90 | 23.60% | 82.70% | 28.54% | 11.10% | 66.90% | 16.59% |
| 100 | 23.30% | 82.80% | 28.14% | 10.90% | 67.00% | 16.27% |

The above and/or other materials may be used in accordance with the invention as described further herein.

Other materials and methods for making liquid crystal in containment medium, e.g., containing, encapsulating, microencapsulating, or the like also are known. Although the description herein refers to microencapsulation in several places, it will be appreciated that an embodiment of the invention relates to the use of liquid crystal material in a containment medium to obtain the structure and operation of the various devices, apparatuses and methods disclosed. Examples of containment medium include gelatin materials, gluteal aldehyde materials, or materials disclosed in U.S. Pat. Nos. 3,578,884; 3,600,060; 3,697,297; 3,674,338; 3,720,623; 3,732,119; 3,734,597; and 3,816,786. One example of encapsulation using gelatin is the use of gelatin in an interfacial reaction with glycoxyl. Sometimes such containment medium may be referred to as having capsule reacted walls.

Other materials which may be used for the containment medium include acrylic, melamine and others.

Several exemplary embodiments of the invention using smectic liquid crystal material are described herein. However, it will be appreciated that other liquid crystal materials for other materials) which have memory may be used in accordance with the invention. One example is cholesteric liquid crystal material alone or in combination with one or more other liquid crystal materials. Also, the cholesteric liquid crystal material may be combined with a dye to take advantage of the color response of cholesteric liquid crystal material and also of the dye. The dye may be dichroic, pleochroic (dichroic dye sometimes is referred to as a special case of pleochroic dye), or even isotropic dye.

Turning to FIG. 5, an apparatus 20 for printing onto a substrate 21 is illustrated schematically. The apparatus 20 may be, for example, a screen printer, sometimes referred to as a silk screen printer. The apparatus 20 is able to print onto the substrate a material 22 of the type described above. Such material, for example, the microencapsulated liquid crystal material with or without dye and with or without the polymeric binder, may be printed onto the substrate 21. Printing may be silk screen printing or printing may be by some other suitable technique. The substrate may be virtually any substrate; nonlimiting examples include paper, metal, cardboard, plastic, polymeric materials, packaging materials, glass, wood, or other materials.

As is depicted in FIG. 6, the substrate 21 may be moved relative to the apparatus 20 so that the material 22 may be printed over a relatively large portion of the substrate. Such movement may be relative, i.e., such that either the substrate is moved relative to the apparatus or vice-versa. In the example of FIG. 6 the substrate 21 is moved over one or more rollers 23 in the direction of arrow 24 as the material 22 is printed on the substrate.

The material 22 may be applied to a substrate 21 by means other than by printing. One example is by painting, roller coating, spraying, or some other technique.

The material 22 may be applied over a large continuous or substantially continuous area of the substrate 21 or it may be applied over only selected areas. For example, the entire surface or a large area of the surface of the substrate 21 may be coated or covered by the material 22. Alternatively, the material 22 may be applied to selected areas, e.g., in desired shapes, such as circles, rectangles, stars, triangles other shapes, shape of characters, such as alpha-numeric characters, shape of cartoon characters, animals, persons, and so forth.

In an embodiment described above it is possible for the material 22 to be applied to a substrate that has an electrode directly associated with the substrate, such as ITO coated Mylar or other plastic, glass or other material. Such an electrode is shown at 6 in FIGS. 1 and 2. A second electrode 6 also may be applied at the opposite face or surface of the material 22 relative to the that proximate to the first mentioned electrode 6. Such second electrode also is illustrated in FIGS. 1 and 2 and is considered designated 6 for convenience. Therefore, for example, as is illustrated in FIGS. 1 and 2, electrodes 6 may be coupled to an electrical power supply to apply an electric field across the liquid crystal material causing a desired alignment of the liquid crystal material.

In another embodiment the material 22 may be applied to a substrate that is without electrodes (electrodeless). In such case the electric field or other prescribed input that causes a desired alignment of the liquid crystal material to result may be applied by another means. Such other means may be electrodes that are mounted on some other device, such as one or more rolls between which the substrate is passed or which pass over the substrate, sprayed charge, plates, or some other means. Also, another type of prescribed input that may be used to affect liquid crystal structure (director) alignment or allow for a change in the same, may be heat or thermal energy. Thus, in response to a prescribed input a desired alignment occurs or may be allowed to occur. Several examples are described below.

In the several examples below the liquid crystal 2 in the material 22 is of the type that has memory. This means that the liquid crystal alignment that is caused by or as a result of some means, such as by or as a result of the application of a prescribed input, remains even after the prescribed input is terminated absent some intervening, event, expiration of a long time constant or some other means. An example is smectic liquid crystal, especially smectic-A liquid crystal. Smectic-A liquid crystal sometimes is referred to as having bulk effects and, therefore, the structural alignment thereof does not tend to revert to a different alignment absent some other input or condition. Smectic liquid crystal material and cholesteric liquid crystal material tend to have this property more than does nematic liquid crystal material; however the name given to the liquid crystal material is not the critical part; rather, it is the described function here that is desired to hold the alignment for the desired time period preferably without the need for continued administering of the prescribed input which had caused or affected the alignment.

For purposes of the following exemplary description, then, the invention is described with respect to a use of Smectic-A liquid crystal in the material 22. Such Smectic-A liquid crystal which has positive dielectric anisotropy characteristics will align with an applied electric field, e.g, as is illustrated in FIG. 2. As a result of such alignment the material 22 may be substantially transparent. The smectic-A liquid crystal material maintains such alignment even after removal of the electric field. However, the material 22 (and substrate 21) may be heated to a temperature that allows the liquid crystal to re-assume the alignment, sometimes referred to as distorted alignment, as is illustrated in FIG. 1. Such heating may actually raise the temperature of the smectic liquid crystal to the smectic to nematic phase transition temperature at which the liquid crystal assumes characteristics of nematic liquid crystal and in such case alignment may be affected by surface effects or the influence of the surfaces of the volumes on the liquid crystal structure, for example, as is described in one or more of the above patents. In the distorted alignment configuration of the liquid crystal the material 22 becomes opaque due to scattering of light and/or if dye, such as pleochroic dye, is included in the liquid crystal, absorption of light. Scattering is due to index of refraction considerations, as is described in one or more of the above patents, for example, the liquid crystal material being birefringent, the extraordinary index of refraction being different from the index of refraction of the medium or microencapsulation material. (Transmission of light without scattering will occur or scattering will be reduced, as is described in one or more of the above patents, if the ordinary index of refraction of the liquid crystal is matched or substantially matched to the index of refraction of the medium or microencapsulation material and the liquid crystal is aligned such that light entering respective volumes primarily experiences the ordinary index of refraction and not the extraordinary index of refraction of the liquid crystal material. For example, such alignment may be in the same direction as light transmission direction.) Absorption is due to absorption by the dye. The absorption can be enhanced by scattering or refraction due to index of refraction considerations, as are described above and in the above patents. In fact, if the liquid crystal material were of low birefringence, such as that in U.S. Pat. No. 4,556,289, and the index of refraction of the liquid crystal and of the medium or microencapsulation material are the same or about the same, and pleochroic dye is included in the liquid crystal material, operation would be transmission or absorption, but in either case, there would be no or relatively little scattering compared to a system in which the extraordinary index of refraction of the liquid crystal and medium are different.

In FIGS. 7 and 8 are illustrated a coated substrate 25 including a substrate 21 and a coating 26 of material 22 thereon. In this example there are no electrodes on the substrate 21.

In FIGS. 9 and 10 are illustrated a coated substrate 25' (primed reference numerals designate parts that are similar in form and/or function to parts described elsewhere and designated by the same unprimed reference numeral) including a substrate 21 and a coating 26' of material 22 at selected locations to form a desired pattern in the shape of stars. The pattern may be other than stars.

In FIGS. 11 and 12 are illustrated a coated substrate 25" including a substrate 21 and a coating 26 of material 22 thereon. A portion of the coating 26 is broken away to show an underlying image 27 that may be printed on or otherwise formed on or with respect to the substrate 21. Although the coated substrate 25" includes a coating 26 over substantially the entire extent thereof, it will be appreciated that the coating may be over less than the entire substrate, e.g., as is illustrated in the embodiment of FIGS. 9 and 10.

Exemplary operation of the several embodiments of coated substrate 25 illustrated in FIGS. 7–12 is described. Depending on the example and desired use there may or may not be pleochroic dye in the liquid crystal. For these descriptions, though, the liquid crystal is of the smectic-A type or some other type which has memory characteristics as is elsewhere described herein. When the liquid crystal is aligned, for example, such that the directors are perpendicular to the substrate, or in such other alignment that the dye has no or little effect and the ordinary index of refraction of the liquid crystal is experienced by light transmitted perpendicularly or substantially perpendicularly toward and away from the substrate, then the substrate easily is seen. If there is an image printed, painted or otherwise formed with respect to the substrate, e.g., as in FIGS. 11 and 12, such image may be seen. However, when the liquid crystal is not so aligned, in other words it is aligned so as to cause scattering of light due to index of refraction considerations and absorption of light by the pleochroic dye, then the substrate would not be seen, or at least the color seen would be a result of the dye. If the dye were cooperative with the color of an image on the substrate, the character of the image could be altered by the absorbing of one or more colors by the dye. If the liquid crystal does not include dye, then a light scattering effect may be obtained when the liquid crystal is in the scattering alignment; and such scattering may block transmission of the image, may result in providing bright reflective spots or areas on the coated substrate, etc.

Also, contrasting areas may be provided on the coated substrate by causing one alignment of liquid crystal in some of the coating and a different alignment of liquid crystal in other portions of the coating. For example, if the coating were over a large area of the substrate and only selected areas were aligned to be transparent and others were absorbing light, if the substrate were bright, e.g., white, or some other color different from the dyed light absorbing areas of the coating, contrasting images can be formed. Also, the contrasting images may be formed in the shape of desired symbols, such as a "smiling face", a company logo, etc. Still further, the contrasting images may be formed in the configuration of alphanumeric characters of the English language or could be characters of any other language. These, of course, are but a few of the various types of images that may be created using the invention.

One example of use of the invention is to provide a substrate with a coating that can be written on one or more times to present a desired image, message or the like. For example, a first message could be written and at a later time another message could be written in addition to the first one or the first message could be erased before or after the second message is written.

Another example of use of the invention is to prepare slides for a slide presentation using a slide projector or to prepare images for projection using an overhead projector or some other type of projector. In such case the slide or substrate one which the image is to be prepared can be "written" on to create a desired image, text, etc. and used to project an image onto a screen or some other surface, etc. The information on the substrate can be erased and the substrate can be reused. If pleochroic dye is included in the liquid crystal, then the image may be formed by contrasting transparent and non-transparent portions on the substrate. If the liquid crystal does not include pleochroic dye, then the image can be formed using a means to discriminate between transmitted and scattered light.

The microencapsulated liquid crystal material may be applied to and used while otherwise exposed on the surface of a substrate. Alternatively, the surface of the microencapsulated liquid crystal material may be protected by another material, such as is illustrated in FIGS. 1 and 2.

Another exemplary use of the invention is as an indicator to show if a temperature limit has been exceeded. For example, the coating material could be applied to the substrate in a pattern that reads, "This product has defrosted at least once." The critical temperature for the liquid crystal material may be selected to be, for example, 32 degrees. The critical temperature is the temperature at or above which the bulk effect is released to allow the liquid crystal alignment to be dominated by the surface effects of the microcapsules. By subjecting the coating to electric field the liquid crystal can be aligned to transparency. As long as the temperature remains below the critical temperature, e.g., the smectic-nematic phase transition temperature or the smectic-isotropic or nematic-isotropic phase transition temperature, such transparency is maintained. However, if the temperature reaches or exceeds the critical temperature, the alignment would be released to the scattering or light absorbing mode; and the message would be viewable. This would be a good indicator to assure that a food product, for example, that is supposed to be frozen in fact has been maintained in the frozen state.

Since the microencapsulated liquid crystal material may be printed onto the substrate, it can be readily easily applied to a film, paper, cardboard, glass, wood, metal, etc., as was mentioned above. It may be applied as a full overcoat or it may be applied only where desired. The coated substrate may be paper and, since it can be written to, erased, and rewritten, the paper is reusable. The same is true for slides or transparencies; and in this case there is the additional advantage that the image can be applied by computer and a printer, as are described further below, virtually at any time. This substantially improves versatility for the presenter; for example, if a particular transparency has been prepared and it is necessary during a conference to apply additional information to the transparency for projection and display to an audience. Another use is for blackboards or marker boards. For example, the encapsulated liquid crystal can be applied to the surface of the board; the board can be written to by either electric field or by thermal energy and can be erased by the opposite of thermal or electric field energy. The amount of energy to required for such thermal energy or electric field ordinarily is not large, and an advantage over prior boards on which markers or chalk had been used is the ability to obtain a bright display and cleanliness; cleanliness is extremely important where it is desirable in an environment to avoid chalk dust or the odors of marker solvents, such as in hospitals or in other places.

Turning to FIG. 13, an electrical system 30 to cause one alignment of liquid crystal is illustrated. In the system 30 a pair of rolls 31, 32 roll against opposite surfaces of the coated substrate 25, such as that of FIGS. 7 and 8 (or any of the others). The rolls 31, 32 have electrically conductive surfaces 33, 34 and those surfaces are electrically connected to an electrical supply 35. The electrical supply may be a battery, a connection to a conventional electrical outlet, an electric generator, etc. The electrical supply 35 may provide AC or DC electrical output that is across the roll surfaces 33, 34. In some liquid crystal devices it is preferred to use AC electrical power to align liquid crystal because of concern for electrical polarization effects; but since the liquid crystal only is briefly exposed to the electric energy, this polarization is not ordinarily of concern. In the illustration of FIG. 13, the electrical supply is a battery 36, one terminal of which is connected to one roll 31 and the other terminal is connected to the roll 32. Since the surfaces 33, 34 of the rolls are electrically conductive (or, if desired, there may be an electrically insulating coating or dielectric coating on the surface below which is an electrically conductive portion), an electric field is applied across the coated substrate 25 causing alignment of the liquid crystal with the field.

Such alignment can be altered by subjecting the liquid crystal to a temperature above the mentioned critical temperature. Therefore, thermal energy can be applied to the coated substrate to alter alignment and visual appearance. The thermal energy also can be applied by rolls to part or all of the coating.

In FIG. 14 is illustrated a thermal printer 40 which may be used to apply thermal energy to selected areas of the coated substrate 25 to alter alignment of the liquid crystal. Therefore, assuming the coated substrate 25 had been set to alignment condition by the electric field using the apparatus of FIG. 13, such coated substrate then can be delivered to a thermal printer 40. The thermal printer 40 may have a conventional thermal print head 41, such as that used to print on conventional thermally responsive paper. Heat applied to selected areas of the coated substrate 25 by the print head 41 will cause the liquid crystal material at those areas to exceed the transition or critical temperature, and upon cooling such liquid crystal material (and dye, if included, will assume a distorted alignment or in any event an alignment which is discernible from the other portions of the coating which had not been subjected to the thermal energy. A computer 42 may be used to supply data to the printer 40 to print information on the coated substrate 25. The coated substrate may be pulled by a roller or other means 43 through the printer and a platen or other surface 44 may be used in conventional manner to maintain spacing between the print head 41 and the substrate at a relatively uniform spacing relation.

The invention has been found to provide a relatively high resolution image capability. There are several reasons, including, among others, due to the materials used and to the ability to provide relatively good control of volume size of the microencapsulated liquid crystal. These characteristics also facilitate control of density and thickness of coatings.

An example of a blackboard or marker board 50 having a coating of microencapsulated liquid crystal 22 as described above is illustrated in FIGS. 15 and 16. The board 50 includes a main support board 51 which may have an electrically conductive surface 52. The microencapsulated liquid crystal coating 22 is coated or is otherwise applied to and supported by the support board 52. An eraser 53 has an electrically conductive surface 54 and is electrically connected to an electrical supply 35, such as a battery 36. The electrically conductive surface 52 of the support board 51 is connected to ground or to a terminal of the supply 35; and the electrically conductive surface 54 of the eraser 53 is connected to the other terminal of the electrical supply. Therefore, as the eraser is wiped across the surface of the coating 22, an electric field is developed between the two surfaces 52, 54 and that field aligns liquid crystal there. If the surface 52 is bright, white, reflective, or the like, it tends to provide a bright background. A separate pointer, writing device, heater wand 55 may be moved into engagement with the surface 22 to apply heat to areas proximate to a heated tip (or hot air outflow from the tip) 56 thereof to raise temperature of the proximate liquid crystal material above the critical or transition temperature thereby to cause the above-described re-alignment of the liquid crystal and, thus, to allow writing on the board. Alternatively, the writing means may be electrical and the erasing means may be a heated roller or a flow of heated air that is blown at or across the surface of the coating 22.

The invention also may be used to print bar codes onto coated substrates. The bar codes may be printed and/or changed when desired by the various processes described above.

It will be appreciated that the various materials described above may be used in the various apparatuses described herein. It also will be appreciated that the above description is by way of example and other equivalent arrangements and uses of the features of the invention are intended to be encompassed hereby.

It also will be appreciated that the various patents and publications mentioned above are incorporated by reference thereto.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims, if attached hereto.

A feature of the invention is a material having a microencapsulated liquid crystal coating thereon; another feature is where the coating is applied by printing; another feature is where the coating is applied by silk screen printing; another feature is where the coating is printed by rolls or by some other technique; another feature is the use of the coating and substrate as an indicator of a temperature limit; another feature is use of the coated substrate as a slide or transparency; another feature is use of the coated substrate as reusable paper; another feature is use of the coated substrate as a blackboard or marker board; many other features also will be evident from the description herein; many other methods also will be evident from the description herein.

Additional features include use of a microencapsulate comprising liquid crystal material encapsulated in polyurethane/polyurea or polyurea polymer walls; and/or wherein the liquid crystal material contains dichroic, pleochroic, or isotropic dye; and/or wherein the liquid crystal material contains a combination of at least one dichroic dye and at least one isotropic dye; and/or wherein the liquid crystal material is selected from the group consisting of nematic, smectic, cholesteric, ferroelectric, and mixtures thereof; and/or wherein the polyurethane/polyurea or polyurea walls are prepared by reacting a polyol or a polyamine with a polyisocyanate; and/or wherein the liquid crystal material contains a dopant, said dopant is selected from a group consisting of a chiral compound, a surfactant or an aligning agent; and/or wherein the polyisocyanate is selected from the group consisting of 1,6-hexamethylene diisocyanate, tolyene-2,4-diisocyanate, tolylene-2,6-diisocyanate, bis-(4-isocyanattocyclohexyl) methane, isophoronediisocyanate, diphenylmethane-4,4-diisocyanate, derivatives thereof and mixtures thereof; and/or wherein the polyol contains from 2 to about 10 hydroxyl groups and from about 2 to about 30 carbon atoms; and/or wherein polyol are selected from the group consisting of diethylene glycol, 2,2'-thiodiethanol, 2-mercaptoethylsulfide, 2-mercaptoethylether, triethylene glycol, 2-methylpropane-1,3-diol, 2-ethylpropane-1,3-diol, 2-n-propylpropane-1,3-diol, 2-n-butylpropane-1,3-diol, 2-methyl-2-n-butylpropane-1,3-diol, diethanolamine, triethanolamine, N-n-butyldiethanolamine, N-ethyidiethanolamine, N-methyidiethanolamine, tris(hydroxymethyl)aminomethane, trimethylolpropane, pentaerythritol, 1,4-butanediol, 1,6-hexanediol, 2,2-bis(hydroxymethyl) propionic acid, dimethylolmelamine, trimethylolmelamine, hexamethylolmelamine and mixtures thereof.

Other features relate to use of a composition for use in preparing microencapsulated liquid crystal material, comprising a liquid crystal material, a polyisocyanate, and a polyol or a polyamine; and/or wherein the polyisocyanate is selected from the group consisting of 1,6-hexamethylene diisocyanate, tolyene-2,4-diisocyanate, tolylene-2,6-diisocyanate, bis-(4-isocyanattocyclohexyl) methane, isophoronediisocyanate, diphenylmethane-4,4-diisocyanate and derivatives and mixtures thereof.

Other features relate to use of a composition comprising at least one liquid crystal material containing a dichroic, pleochroic or isotropic dye, and at least one polyisocyanate, having from about 8 to 30 carbons, where the isocyanate is soluble in liquid crystal material; and at least one polyol or polyamine, where the polyol is soluble in water and contains at least two primary alcohol groups and where the polyamine is soluble in the liquid crystal material and contains at least two primary or secondary amino groups; and/or wherein the liquid crystal material contains a dichroic dye.

Other features relate to use of a method of preparing microencapsulated liquid crystal droplets, comprising the steps of (A) providing (1) a liquid crystal material containing a dichroic or isotropic dye, (2) at least one polyisocyanate and (3) at least one polyol or polyamine; and (B) polymerizing (2) and (3) to form a polyurea or polyurethane/polyurea polymer; and/or wherein the liquid crystal droplet is microencapsulated within a capsule wall; and/or further comprising the steps of adding a binder and an adhesive in order to be suitable for application to an indium tin oxide coated substrate; and/or wherein the liquid crystal material, the binder and the adhesive are selected so that the difference between the ordinary index of refraction of the liquid crystal material, the index of refraction of the dye, the index of refraction of the binder, and the index of refraction of the adhesive is less than about 0.03; and/or wherein the index of refraction difference is less than about 0.01; and/or wherein the index of refraction difference is less than about 0.001; and/or wherein the product of polyisocyanate, having at least two isocyanate groups and about 8 to 30 carbon atoms; and/or further comprising adding at least one amine or tin catalyst in an amount sufficient to accelerate the polymerization of step (B); and/or wherein the amine catalyst is selected from the group consisting of triethylenediamine, triethylamine, tetramethyl-1,3-butanediamine; N-methylmorpholine, and the mixtures thereof; and/or wherein the tin catalyst is selected from dibutyltin diacetate, tributyltin acetate, dibutyltin dilaurate and mixtures thereof; and/or further comprising the step of centrifuging the microencapsulated liquid crystal droplets; and/or wherein the microencapsulated liquid crystal droplets are substantially monodispersed.

Other features relate to a device containing or utilizing microencapsulated liquid crystal droplets as is disclose herein; and/or to the inclusion of binders, adhesives and indium tin oxide coated substrates.

Briefly, according to one aspect of the invention, liquid crystal material is microencapsulated by a method utilizing an interfacial polymerization reaction which creates a combination of polyurethane and polyurea polymers which form the capsule walls surrounding the discrete liquid crystal droplets. The formed capsule walls are designed to have an adjustable refractive index so as to allow for the matching of the refractive index to that of the liquid crystal and polymeric binder materials. This allows for the production of a liquid crystal droplet surrounded by polymer film, which is optically clear when the liquid crystal director is aligned with the electric field. The microencapsulated liquid crystal droplets improves the dye stability of a dichroic dye and enhances the contrast of a liquid crystal display.

As was mentioned above, cholesteric liquid crystal material may be used in the invention. For example, cholesteric liquid crystal material tends to have a color response to alignment its alignment or pitch; and such alignment or pitch may remain constant, for example, in a containment medium, unless disturbed, e.g., by application of a prescribed input, such as an electric or magnetic field or in response to heat or temperature.

Figure 17:
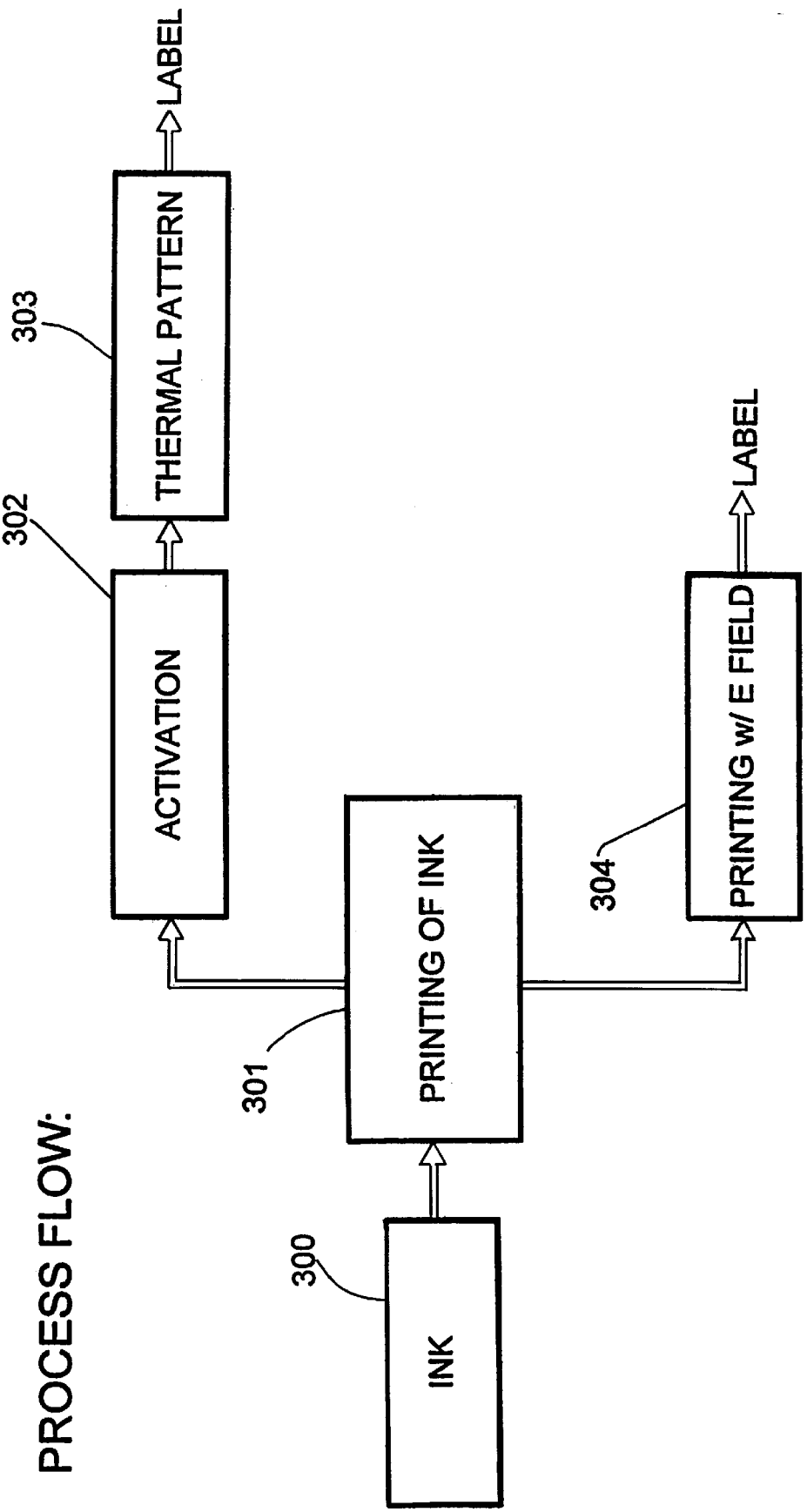
FIG. 17 is flow chart.

In FIG. 17 is a process flow diagram using the invention. The capsules are in the form of ink, such as capsules in a polymeric binder in a source or supply 300. The ink can be printed 301 onto a substrate, for example. The substrate may be activated at 302 by electric field to provide a first output, for example clear or tinted light transmission, or some other way output; and a thermal pattern or wording may be applied at 303 using, for example a thermal printer. Exemplary substrates onto which the microencapsulated liquid crystal may be applied in this or other examples are aluminized paper, aluminized Mylar(tm), anti-static Mylar, paper treated to be anti-static; and these may facilitate applying electric field or charge, as may be desired. Exemplary methods for laying down the microencapsulated liquid crystal material (possibly in a polymeric binder, for example) include knife over roll, doctor blade, silk screen, flexotgraphic printing. Advantageously, the material may be stored at room temperature independent of the event temperature (such as thawing mentioned above at which a prescribed pattern, for example, is erased), it can provide multi-color functions, outputs, etc., and can be applied by standard printing techniques. Exemplary uses include a reusable display media, labels for indicating frozen food integrity, blood bank storage, and others.

What is claimed is:

1. An article, comprising
   a substrate, and
   microencapsulated liquid crystal material on or in said substrate and comprising liquid crystal in a containment medium, which exhibits memory, is responsive to electric fields to produce one distinguishable output and is responsive to temperature to produce a second distinguishable output,
   the article being made by the process of printing the microencapsulated liquid crystal material on the substrate, and the article being placeable relative to a print head to print information thereon by causing a prescribed distinguishable output by the microencapsulated liquid crystal material.

2. The article of claim 1, said microencapsulated liquid crystal material including dichroic, pleochroic or isotropic dye, the ordinary index of refraction of the liquid crystal being matched to the index of refraction of the containment medium to reduce light scattering in response to a prescribed liquid crystal alignment.

3. The article of claim 1, the microencapsulated liquid crystal material comprising capsules of liquid crystal in a containment medium, the capsules being monodispersed in a polymeric binder.

4. The article of claim 1, said substrate having a surface and said microencapsulated liquid crystal material being printed in a pattern over selected areas less than all of the surface.

5. The article of claim 1, said printing comprising printing on an electrodeless substrate.

6. The article of claim 1, said containment medium comprising a cross-linked material.

7. A method of making a liquid crystal article, comprising applying microencapsulated liquid crystal material that is responsive to electric field or to temperature to a substrate by a process selected from a group consisting of printing, painting, roller coating and spraying, said applying comprising applying smectic liquid crystal material that has memory in a pattern.

8. The method of claim 7, said applying comprising applying the material to an electrodeless substrate.

9. The method of claim 7, said substrate having a surface, and said applying comprising applying the material to cover substantially the entire surface.

10. The method of claim 7, said substrate having a surface, and said applying comprising applying the material in a pattern to cover less than the entire surface.

11. A method of indicating the exceeding of a temperature condition or the results of such exceeding, comprising
    setting a microencapsulated liquid crystal device to a condition representative of such temperature condition not having been exceeded,
    selecting the microencapsulated liquid crystal device to respond to the exceeding of such temperature condition and to have memory to maintain the results of such response although the temperature condition returns to a temperature below such exceeded temperature.

12. The method of claim 11, further comprising using a thermal print head to cause the liquid crystal device to display a distinguishable output.

13. Method of aligning a liquid crystal material or causing a prescribed optical mode or condition of liquid crystal material, the liquid crystal material being in a containment medium and having memory, comprising
    effecting relative movement between the liquid crystal material in a containment medium and a print head, and
    using the print head applying energy to the liquid crystal material in a containment medium.

14. The method of claim 13, further comprising spraying electric charge at the liquid crystal material in a containment medium to produce a different optical mode or condition of the liquid crystal material.

15. Method of aligning a liquid crystal material or causing a prescribed viewably discernable optical mode or condition of liquid crystal material, the liquid crystal material being in a containment medium and having memory, comprising
    effecting relative movement between the liquid crystal material in a containment medium and a print head for applying electromagnetic energy to the liquid crystal material in a containment medium, and
    applying electromagnetic energy to the liquid crystal material.

16. A label article, comprising
    liquid crystal means in or on a label type substrate for providing at least two distinguishable outputs, said liquid crystal means including liquid crystal in a containment medium, said liquid crystal means having memory, being responsive to temperature to provide one distinguishable output, and being responsive to electric field to produce the other distinguishable output, wherein the liquid crystal in a containment medium is on or in the substrate and wherein the label article is placeable relative to a print head to apply input to the liquid crystal material to cause a distinguishable output to display information.

17. A method of labeling a product, comprising
    applying to the product a label comprising liquid crystal means for providing at least two distinguishable outputs, respectively, based on temperature and electric field, said liquid crystal means including liquid crystal in a containment medium, said liquid crystal means having memory, further comprising using a thermal print head to apply thermal input to the label to cause a distinguishable output to display information.

* * * * *